(12) United States Patent
Eslami et al.

(10) Patent No.: US 8,413,496 B2
(45) Date of Patent: Apr. 9, 2013

(54) PRESSURE COMPENSATION UNIT

(75) Inventors: Reza Eslami, Schwieberdingen (DE);
Masoud Habibi, Schwieberdingen (DE);
Marcell Ott, Nersingen (DE); Thomas Fessele, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/735,346

(22) PCT Filed: Dec. 1, 2008

(86) PCT No.: PCT/EP2008/066549
§ 371 (c)(1),
(2), (4) Date: Sep. 27, 2010

(87) PCT Pub. No.: WO2009/089959
PCT Pub. Date: Jul. 23, 2009

(65) Prior Publication Data
US 2011/0041594 A1 Feb. 24, 2011

(30) Foreign Application Priority Data
Jan. 15, 2008 (DE) .......................... 10 2008 004 358

(51) Int. Cl.
*G01M 15/00* (2006.01)

(52) U.S. Cl. ....................................... 73/114.43; 73/708
(58) Field of Classification Search ............... 73/114.43, 73/708
See application file for complete search history.

(56) References Cited

U.S. PATENT DOCUMENTS

| | | | |
|---|---|---|---|
| 5,661,244 A | 8/1997 | Nishimura et al. | |
| 5,692,637 A | 12/1997 | Hodge | |
| 6,155,119 A | 12/2000 | Normann et al. | |
| 8,109,148 B2* | 2/2012 | Habibi et al. | 73/708 |
| 2008/0041624 A1* | 2/2008 | Sasaki et al. | 174/520 |

FOREIGN PATENT DOCUMENTS

| | | |
|---|---|---|
| DE | 41 33 061 | 4/1993 |
| WO | WO 02/090916 | 11/2002 |

* cited by examiner

*Primary Examiner* — Freddie Kirkland, III
(74) *Attorney, Agent, or Firm* — Kenyon & Kenyon LLP

(57) ABSTRACT

A pressure-compensation unit, particularly for a tank-pressure sensor in a tank of a motor vehicle. The pressure-compensation unit includes a housing lid and a gas-permeable filter diaphragm, which covers an air hole. The pressure-compensation unit includes a cap-shaped cover element, which covers the filter diaphragm.

15 Claims, 2 Drawing Sheets

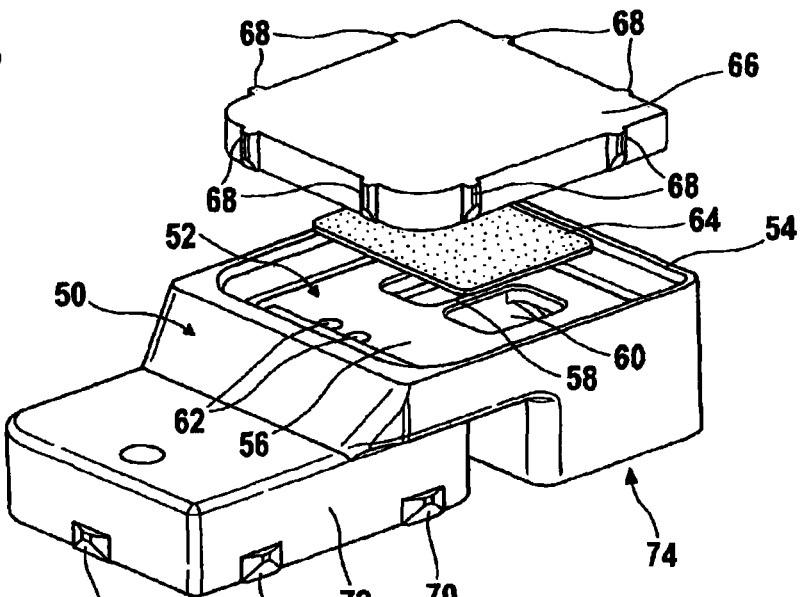
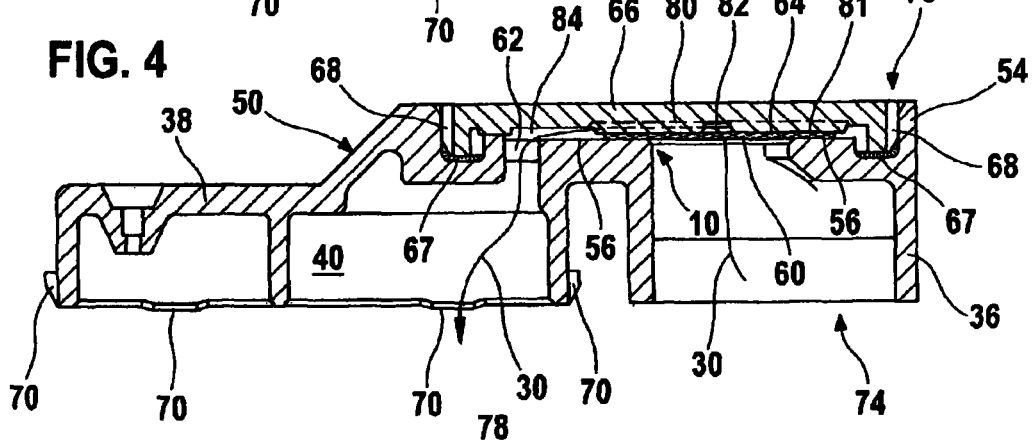

PRESSURE COMPENSATION UNIT

BACKGROUND OF THE INVENTION

1. Field of the Invention

The present invention relates to a pressure compensation unit.

2. Description of Related Art

U.S. Pat. No. 5,661,244 relates to a pressure sensor which is used for measuring the pressure in a fuel tank. The pressure sensor includes a pressure supply line made of a metallic material, which is introduced into the pressure intake of a metal housing, where it is fixed in place by welding. The housing includes a flange section in the upper region, the flange section being connected to an outer wall of a tank, which represents the object to be measured, such that the pressure sensor is located on the inside of the tank. A porous filter, made from a fluoroplastic plastic, is disposed next to an atmospheric pressure intake. An adhesive tape is affixed at the atmospheric pressure intake in removable manner. The pressure sensor allows the safe operation and provides very high reliability for a sensor element with regard to the exclusion of air; there are also fewer restrictions with respect to the design of the sensor for small spaces, and it reliably avoids the entry of air and water or dust into the interior of the sensor.

Pressure-compensation components are installed inside a tank pressure sensor and compensate pressure differences between a reference space of the tank pressure sensor and the environment. The tank pressure is routed to the backside of a silicon diaphragm from below, while the pressure prevailing in the environment is acting as reference pressure from above, e.g., through an opening in the sensor housing, on the front side of the silicon diaphragm. A gas-permeable filter diaphragm is installed in a reference-pressure opening in order to protect the front side of the silicon diaphragm from water. The gas-permeable filter diaphragm acts as pressure-compensation element. The pressure-compensation element is usually water-repellent and impervious to fluids; it also seals the reference-pressure opening of the tank-pressure sensor of the tank installation unit from fluid. This design approach is meant to prevent the penetration of spray water and other fluid or solid media into the sensor space, regardless of the installation position of the pressure-compensation element.

SUMMARY OF THE INVENTION

The present invention is based on the objective of protecting a filter diaphragm of a differential-pressure sensor from overloading, and of bringing about a rapid pressure compensation between the environment and a sensor interior at the same time.

Adopting the design approach according to the present invention, a housing lid having an integrated dome is used as support for a filter diaphragm. The filter diaphragm is preferably designed in the shape of a disk and adhesion-bonded to the dome-shaped projection integrated in the housing lid and formed there, preferably in centered manner. A lead-through developed in the dome-shaped projection ensures that a reference-pressure volume in the sensor interior is connected to the atmosphere surrounding it. Using a cap which is able to be latched onto the dome-shaped projection formed in the housing lid, the adhesion-bonded filter diaphragm is shielded from environmental effects and also from mechanical damage. The cap which is to be latched at the dome-shaped projection formed in the housing lid is used for shielding the filter diaphragm. The cap integrated on the dome-shaped projection has no points of contact whatsoever with the filter diaphragm and its bonding to the dome-shaped projection. This variant of an embodiment is characterized by the fact that the dome-shaped projection protects the centrically adhesion-bonded filter diaphragm from below against loading, i.e., by water. Moreover, this variant of an embodiment of the idea on which the present invention is based ensures that the sealing of a reference-air borehole by soil particles that have gained entry, or the filling with water of the interior of the tank pressure sensor is prevented.

In one further specific development of the idea on which the present invention is based, a housing lid is used as support of the filter diaphragm. The provided filter diaphragm, which preferably is water-repellent and impervious to fluids, is adhesion-bonded to the housing lid at its edge, the filter diaphragm being protected by a cap. A segment formed in the housing lid prevents the planar filter diaphragm from sagging. Channels are developed in a cap protecting the filter diaphragm from above. The cap lies in planar manner directly on top of the filter diaphragm and thus supports the filter diaphragm. The channels provide sufficient air flow in order to ensure pressure differentials between the environment and a reference space of the sensor. The housing lid, which acts as support of the filter diaphragm, has openings, which connect a reference-pressure volume in the sensor interior to the atmosphere surrounding it. For this variant of an embodiment it is advantageous to select the installation location of the pressure-compensation unit such that the free filter diaphragm is additionally protected via the installation location and the installation position.

The advantages of the afore-described second specific embodiment of the idea on which the present invention is based are that fluid media do not collect on the filter diaphragm and thus do not lead to ice buildup inside the reference air opening. The filter diaphragm used in the alternative specific embodiment, which is bonded to the housing lid in the edge region, is protected from overloading from above by a cap-shaped cover element. Furthermore, the pressure-compensation unit provided according to the present invention is characterized by a larger surface and a more optimal pressure compensation in the reference space this creates.

BRIEF DESCRIPTION OF THE SEVERAL VIEWS OF THE DRAWING

The present invention is described in greater detail in the following text with the aid of the drawing.

FIG. 3 shows an exploded view of a further specific development of the pressure-compensation unit integrated in the lid of a tank-pressure sensor according to the present invention.

FIG. 4 shows the air flow coming about when the cap-shaped sealing element has been installed.

FIG. 5 shows a perspective view of the inside of the cap-shaped sealing element.

DETAILED DESCRIPTION OF THE INVENTION

Figure 1:
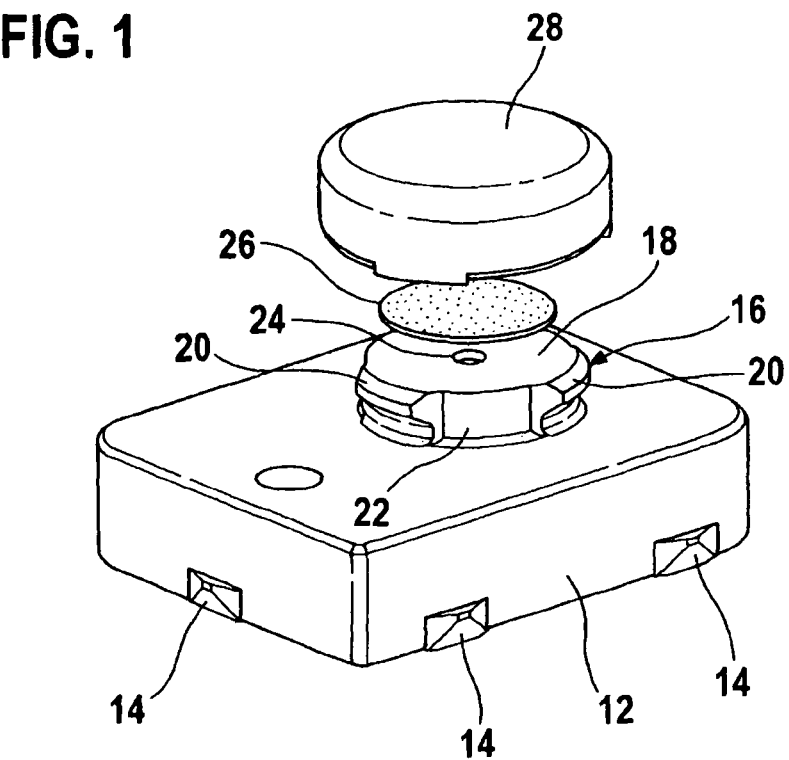
FIG. 1 shows an exploded view of a first specific development of the pressure-compensation unit integrated in the lid of a tank-pressure sensor provided according to the present invention.

The illustration according to FIG. 1 shows the exploded view of a first specific embodiment of the pressure-compensation unit (integrated in the lid of a tank-pressure sensor) provided according to the present invention.

FIG. 1 shows a housing lid 12 of a tank-pressure sensor, which is provided with a number of latching tabs 14. With the aid of these tabs housing lid 12 is clamped in a tank-pressure sensor. Housing lid 12 includes a projection 16 implemented in the shape of a dome. Dome-shaped projection 16 is delimited by a planar surface 18, which in this case is in the form of a circular shape. Extending along the circumference of dome-shaped projection 16 are several latching segments 20 implemented in the form of circular arcs, which are separated from each other by gaps 22 in the circumferential direction. Furthermore, an air hole 24 is situated in planar surface 18 of dome-shaped projection 16. Housing lid 12 is part of the pressure-compensation components of pressure-compensation unit 10.

A filter diaphragm 26, which preferably is implemented in the form of a water-repellent filter diaphragm and is impervious to fluid, is adhesion-bonded to planar surface 18 of the dome-shaped projection. It is used for protecting the interior of the tank-pressure sensor from fluid media and dust. As a result, the penetration of spray water as well as other fluid or solid media into the housing of the tank-pressure sensor is able to be prevented, regardless of the installation position of housing lid 12 of a tank-pressure sensor.

Filter diaphragm 26, adhesion-bonded to planar surface 18 of dome-shaped projection 16, is protected by a cap-shaped cover element 28, which is able to be latched to latching segments 20 developed along the circumference of dome-shaped projection 16. Cap-shaped cover element 28 protects adhesion-bonded, water-repellent and fluid-impermeable, but gas-permeable, filter diaphragm 26 from environmental effects as well as from mechanical damage. Cap-shaped cover element 28 has no points of contacts with filter diaphragm 26 and its adhesion-bonding to planar surface 18 of dome-shaped projection 16.

Figure 2:
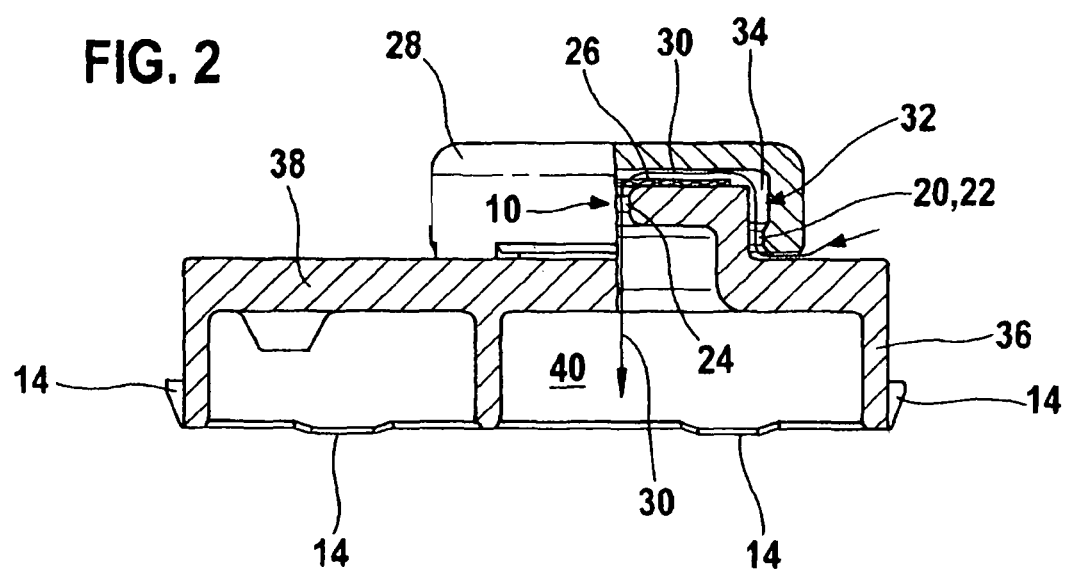
FIG. 2 shows a representation of the pressure-compensation unit with an illustration of an air flow path.

As can be gathered from the illustration according to FIG. 2, a gap width 34 forms in the region of a catch mechanism 32 when cap-shaped cover element 28 is fixed in place on dome-shaped projection 16 by latching, the catch mechanism being formed by latching segments 20 at the circumference of dome-shaped projection 16 and the inside of cap-shaped cover element 28. Reference numeral 30 denotes an air flow depicted as moving from the outside to the inside. From the illustration according to FIG. 2 it can be gathered that filter diaphragm 26 adhesion-bonded to the top of planar surface 18 is acted upon by ambient pressure through gap 34 and on the other side from the direction of the inside of dome-shaped projection 16, i.e., via air hole 24 in dome-shaped projection 16, by the pressure prevailing inside a reference space 40 of the tank pressure sensor.

Water-repellent, fluid-tight but gas-permeable filter diaphragm 26, which is used as pressure-compensation element, allows for a rapid pressure compensation between the environment and reference space 40. Cap-shaped cover element 28 disposed at latching segments 20 of dome-shaped projection 16 reliably protects filter diaphragm 26 bonded to planar surface 18 from mechanical overloads, such as impinging water. Furthermore, cap-shaped cover element 28 which is fixed in place at latching segments 20 in detachable manner within the framework of catch mechanism 32, ensures that no particles or similar matter are able to damage filter diaphragm 26, and that no particles or the like reach reference space 40 of the tank pressure sensor through air-intake hole 24. The air-percolation area of filter diaphragm 26 is greater in size than the area of air hole 24.

Furthermore, the design approach according to the first specific development as shown in FIGS. 1 and 2 prevents air hole 24 between reference pressure space 40 of the tank pressure sensor and the environment from getting clogged, e.g., by a water droplet caught there, so that no pressure compensation is able to take place between the environment and reference pressure space 40 of the tank pressure sensor.

The illustration according to FIG. 3 shows an exploded view of another variant of an embodiment of the pressure-compensation unit according to the present invention.

FIG. 3 shows an additional housing lid 50, which on the one side has an intake opening 74, at which the ambient pressure is applied, and a wall 72 where several clamping lugs 70 are implemented on the other side. These clamping lugs fix additional housing lid 50 in place on the housing of a tank pressure sensor by clamping.

Further housing lid 50 according to the exploded view in FIG. 3 includes a depression 52. Depression 52 is delimited by a wall 54 extending in the circumferential direction on the one hand, and by a base 56 on the other. Situated in base 56 is an opening 60, which is subdivided by a segment 58. Furthermore, at least one air hole 62 is provided in base 56 of depression 52. A filter diaphragm 64 is adhesion-bonded to base 56 at the edge of opening 60. Filter diaphragm 64, which preferably is water-repellent and impervious to fluid, is supported by segment 58, and protected on the other side by cap-shaped cover element 66 which is able to be clamped in place inside wall 54 of additional housing lid 50. Cap-shaped cover element 66 includes at its circumference a number of clamping lugs 68, with whose aid cap-shaped cover element 66 is able to be latched in place in wall 54 delimiting depression 52. In addition, cap-shaped cover element 66 is able to be mounted on additional housing lid 50 by adhesion bonds 67, as indicated in FIG. 3.

FIG. 4 shows a side view of the illustration of the air flow in the pressure-compensation unit according to the exploded view in FIG. 3.

From FIG. 4 it can be gathered that cap-shaped cover element 66 is clamped in depression 52 (cf. illustration according to FIG. 3), and that it is resting via its clamping lugs 68 at the inner side of wall 54 delimiting depression 52. Situated above opening 60 in additional lid 50 is filter diaphragm 64. Cap-shaped cover element 66 extends above filter diaphragm 64. From the illustration according to FIG. 4 it can be gathered that starting from intake opening 74, air flow 30 runs through gas-permeable filter diaphragm 64 via channels 80, 82 through air holes 62 into reference pressure space 40 of the tank pressure sensor. Gap 84 is delimited between additional housing lid 50 and inner side 78 of cap-shaped cover element 66. Through gas-permeable filter diaphragm 64, which covers opening 60 having segment 58 and which acts as pressure-compensation element, a pressure compensation is able to take place between the ambient pressure applied at intake opening 74 of additional housing lid 50 and the pressure applied in reference chamber 40. As can be gathered from the illustration according to FIG. 4, which reproduces cap-shaped cover element 66 in a state in which it is clamped and bonded inside depression 52, filter diaphragm 64 is effectively protected both from mechanical damage and from overloading by impinging spray water. The position of cap-shaped cover element 66 enables air flow 30, starting from intake opening 74, through gas-permeable filter diaphragm 64 in the direction of gap 84. Along its circumference, cap-shaped cover element 66 is preferably bonded to depression 52 at the upper surface of additional housing lid 50, cf. reference numeral 67 in FIG. 4. Via projections 81, which are formed on its inner side 78, cap-shaped cover element 66 is resting directly on filter diaphragm 64 (cf. the illustration in FIG. 5).

FIG. 5 shows a perspective view of the inside of cap-shaped cover element 66 according to the illustrations in FIGS. 3 and 4.

Cap-shaped cover element 66, which preferably is produced as injection-molded component, is provided with a number of clamping lugs 68 at its circumference. Clamping lugs 68 are used for positioning cap-shaped cover element 66 within wall 54 of depression 52. Air channels 80, 82 run on an inner side 78 of cap-shaped cover element 66. The air channels denoted by reference numeral 80 run in the longitudinal direction, i.e., parallel to segment 58 implemented in housing component 50 within opening 60 in base 56 of depression 52. Reference numeral 82 denotes an air channel on inner side 78 of cap-shaped cover element 66 that runs in the transverse direction and interconnects air channels 80, which run in the longitudinal direction. Air channels 80, 82 on the inner side 78 are separated in raised manner via these raised projections 81. Projections 81 are planar regions which are resting directly on the top surface of filter diaphragm 64 in the installed state of cap-shaped cover element 66 illustrated in FIG. 4. An airtight connection of cap-shaped cover element 66 within depression 52 to additional housing lid 50 is accomplished by an adhesion bond 67 along the circumference of cap-shaped cover element 66. Due to the airtight connection produced in this manner a pressure-compensation between reference-pressure chamber 40 and the atmosphere takes place only via opening 60 to reference-pressure chamber 40, which opening is covered by filter diaphragm 64.

The design of inner side 78 of cap-shaped cover 66 as illustrated in FIG. 5 allows for air flow 30 illustrated in FIG. 4 when cap 66 is positioned in depression 52 of additional housing lid 50 and fixed in place there by bonding. Via air channels 80, 82 on inner side 78 of cap-shaped cover 66, air supply 30, in the installed state of cap-shaped cover 66, travels above permeable filter diaphragm 64 in the direction of gap 84 shown in FIG. 4 between additional housing lid 50 and inner side 78 of cap-shaped cover 66 installed in depression 52 in airtight manner.

Similar to cap-shaped cover 66, additional lid 50 shown in FIG. 4 is also produced with the aid of the injection molding method. This means that intake opening 74 on additional lid 50 of pressure-compensation unit 10 provided according to the present invention is able to be injection-molded in a single working step together with depression 52 for accommodating cap-shaped cover 66. When producing additional housing lid 50 by the plastic injection-molding method, air holes 62, segment 58 dividing opening 60, clamping lugs 70, wall 54, and base 56 of depression 52 are able to be produced in one process step. The sectional view according to FIG. 4 illustrates the possibility of implementing a wall 36 of additional housing lid 50 and cap-shaped cover 66 at different thicknesses, depending on the mechanical requirements.

In the first variant of an embodiment of the pressure compensation unit provided according to the present invention as shown in FIGS. 1 and 2, filter diaphragm 26 is protected from below from loading, e.g., spray water, by dome-shaped projection 16, and the sealing of air hole 24 by water is impossible due to the waiter-repellent filter diaphragm; in the second variant of an embodiment of pressure-compensation unit 10 provided according to the present invention and shown in FIGS. 3, 4 and 5, filter diaphragm 26 is protected against excess loads and the collection of spray water by cap-shaped cover 66 installed in depression 52 in airtight manner. The tank pressure sensor according to the second variant of an embodiment as shown in FIGS. 3 and 4, is to be installed in such a way that open intake opening 74 does not point in the upward direction. The second variant of an embodiment of the pressure-compensation unit provided according to the present invention as shown in FIGS. 3, 4, and 5, is preferably installed in such a way that cap 66 provided with air channels 80, 82 on inner side 78 points up and covers filter diaphragm 64 disposed underneath in order to prevent the collection of water in the intake opening and ice buildup at that location.

The pressure-compensation unit provided according to the present invention in the form of the specific embodiments described in greater detail in the text above ensures that no fluid media collects on filter diaphragms 26, 64 and thereby causes ice buildup, particularly inside air hole 60. Cap 28, 66 effectively protects filter diaphragm 26, 64 from loads from above such as impinging spray water. Furthermore, the design approach according to the present invention makes it possible to considerably enlarge the area of filter diaphragm 26, 64, so that water is unable to wet opening 24, 60 and filter diaphragm 26, 64. This prevents opening 24, 60 from getting clogged by freezing water.

What is claimed is:

1. A pressure-compensation unit for a tank pressure sensor of a motor vehicle, comprising: a housing lid, an air hole, a gas-permeable filter diaphragm which covers the air hole, and a cap-shaped cover element which covers the filter diaphragm, wherein the housing lid has a dome-shaped prosection having a planar surface, the air hole is located in the planar surface, and the filter diaphragm is adhesion-bonded onto the planar surface.

2. The pressure-compensation unit as recited in claim 1, wherein the filter diaphragm is made from a water-repellent material which is impermeable for fluid.

3. The pressure-compensation unit as recited in claim 1, wherein the cap-shaped cover element is able to be latched to the dome-shaped projection.

4. The pressure-compensation unit as recited in claim 1, wherein latching segments are provided along the circumference of the dome-shaped projection, which are separated from each other in the circumferential direction by gaps, which form a gap width for an air flow.

5. The pressure-compensation unit as recited in claim 3, wherein the filter diaphragm is protected when the cap-shaped cover element is latched, and a connection exists between a reference-pressure space and the environment.

6. The pressure-compensation unit as recited in claim 5, wherein the filter diaphragm is supported by direct contact with the planar surface to protect against excessive loading, and an air flow takes place through an air hole.

7. A tank-pressure sensor for a fuel tank of a motor vehicle comprising the pressure-compensation unit as recited in claim 1.

8. A pressure-compensation unit for a tank pressure sensor of a motor vehicle, comprising: a housing lid, an air hole, a gas-permeable filter diaphragm which covers the air hole, and a cap-shaped cover element which covers the filter diaphragm, wherein the housing lid has a depression whose base has an opening to the atmosphere, and the filter diaphragm is adhesion-bonded at the edge of the opening to the atmosphere onto the base of the depression.

9. The pressure-compensation unit as recited in claim 8, wherein the opening to the atmosphere is covered by the filter diaphragm, and the housing lid has at least one opening to a reference-pressure space.

10. The pressure-compensation unit as recited in claim 8, wherein the cap-shaped cover element is adhesion-bonded to the housing lid in airtight manner.

11. The pressure-compensation unit as recited in claim 10, wherein channels for air flow are defined on an inner side of the cap-shaped cover element, and projections supporting the filter diaphragm are implemented on the inner side.

12. The pressure-compensation unit as recited in claim 11, wherein when the cap-shaped cover element is adhesion-bonded in the depression, the channels on the inner side of the cap-shaped cover element provide the air flow from an intake opening in the housing lid to at least one opening into a reference-pressure space.

13. The pressure-compensation unit as recited in claim 11, wherein the filter diaphragm is supported by the projections at the inner side, and an air flow through the channels takes place.

14. The pressure-compensation unit as recited in claim 9, wherein the opening to the atmosphere in the base of the depression is divided by a segment and the filter diaphragm is supported by the segment.

15. The pressure-compensation unit as recited in claim 14, wherein the cap-shaped cover element at its circumference includes a plurality of clamping lugs, the clamping lugs being latched in a wall bordering the depression.

\* \* \* \* \*

UNITED STATES PATENT AND TRADEMARK OFFICE
CERTIFICATE OF CORRECTION

PATENT NO. : 8,413,496 B2 Page 1 of 1
APPLICATION NO. : 12/735346
DATED : April 9, 2013
INVENTOR(S) : Eslami et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 344 days.

Signed and Sealed this
First Day of September, 2015

Michelle K. Lee
*Director of the United States Patent and Trademark Office*